US 7,485,232 B2
Feb. 3, 2009

(12) United States Patent
Yamasaki et al.

(54) WATER TREATMENT METHOD AND WATER TREATMENT APPARATUS

(75) Inventors: Kazuyuki Yamasaki, Hiroshima (JP); Kazuyuki Sakata, Fukuyama (JP); Kazumi Chuhjoh, Takamatsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 24 days.

(21) Appl. No.: 11/602,209

(22) Filed: Nov. 21, 2006

(65) Prior Publication Data

US 2007/0114176 A1 May 24, 2007

(30) Foreign Application Priority Data

Nov. 22, 2005 (JP) ............... 2005-336826

(51) Int. Cl.
C02F 3/00 (2006.01)
(52) U.S. Cl. ................. 210/617; 210/629; 210/150; 210/194
(58) Field of Classification Search ........... 210/615, 210/616, 617, 620, 629, 150, 151, 194
See application file for complete search history.

(56) References Cited

U.S. PATENT DOCUMENTS

| 5,423,988 | A | * | 6/1995 | Yamasaki et al. | 210/151 |
| 5,578,214 | A | * | 11/1996 | Yamasaki et al. | 210/151 |
| 5,702,594 | A | * | 12/1997 | Yamasaki et al. | 210/151 |
| 5,702,604 | A | * | 12/1997 | Yamasaki et al. | 210/151 |
| 5,863,433 | A | * | 1/1999 | Behrends | 210/150 |
| 6,056,876 | A | * | 5/2000 | Yamasaki et al. | 210/617 |
| 6,059,963 | A | * | 5/2000 | Horakova et al. | 210/150 |
| 6,177,005 | B1 | | 1/2001 | Yamasaki et al. | |
| 6,209,855 | B1 | * | 4/2001 | Glassford | 210/150 |
| 6,830,690 | B2 | * | 12/2004 | Schmid | 210/151 |
| 7,329,341 | B2 | * | 2/2008 | Yamasaki et al. | 210/150 |
| 2007/0023356 | A1 | * | 2/2007 | Cuenca | 210/151 |
| 2007/0062869 | A1 | * | 3/2007 | Yamasaki et al. | 210/620 |
| 2007/0068869 | A1 | * | 3/2007 | Yamasaki et al. | 210/620 |
| 2007/0095751 | A1 | * | 5/2007 | Yamasaki et al. | 210/220 |
| 2007/0138091 | A1 | * | 6/2007 | Yamasaki et al. | 210/620 |
| 2007/0275452 | A1 | * | 11/2007 | Yamasaki et al. | 435/252.1 |

FOREIGN PATENT DOCUMENTS

| JP | 3095620 | 8/2000 |
| JP | 2003-251384 | 9/2003 |
| JP | 3467671 | 9/2003 |
| JP | 2003-334548 | 11/2003 |
| JP | 2004-121962 | 4/2004 |

(Continued)

OTHER PUBLICATIONS

JP 8-99092, issued Apr. 16, 1996 (corresponding to above-noted U.S. Patent No. 5,578,214).

(Continued)

*Primary Examiner*—Christopher Upton
(74) *Attorney, Agent, or Firm*—Nixon & Vanderhye P.C.

(57) ABSTRACT

In a water treatment apparatus, microorganisms propagating on wood charcoal are activated by micro-nano bubbles contained in treatment water. Water treatment is carried out with the activated microorganisms propagated on the wood charcoal. Thereby, a stable treatment is achieved. Organic matters adsorbed by the wood charcoal are decomposed by the activated microorganisms propagated on the wood charcoal.

12 Claims, 7 Drawing Sheets

FOREIGN PATENT DOCUMENTS

| | | |
|---|---|---|
| JP | 2004-237144 | 8/2004 |
| JP | 2004-267869 | 9/2004 |
| JP | 2004-321959 | 11/2004 |
| JP | 4029110 | 10/2007 |
| WO | WO 2007/032104 * | 3/2007 |

OTHER PUBLICATIONS

JP 11-114596, issued Apr. 27, 1999 (corresponding to above-noted U.S. Patent No. 6,177,005).

* cited by examiner

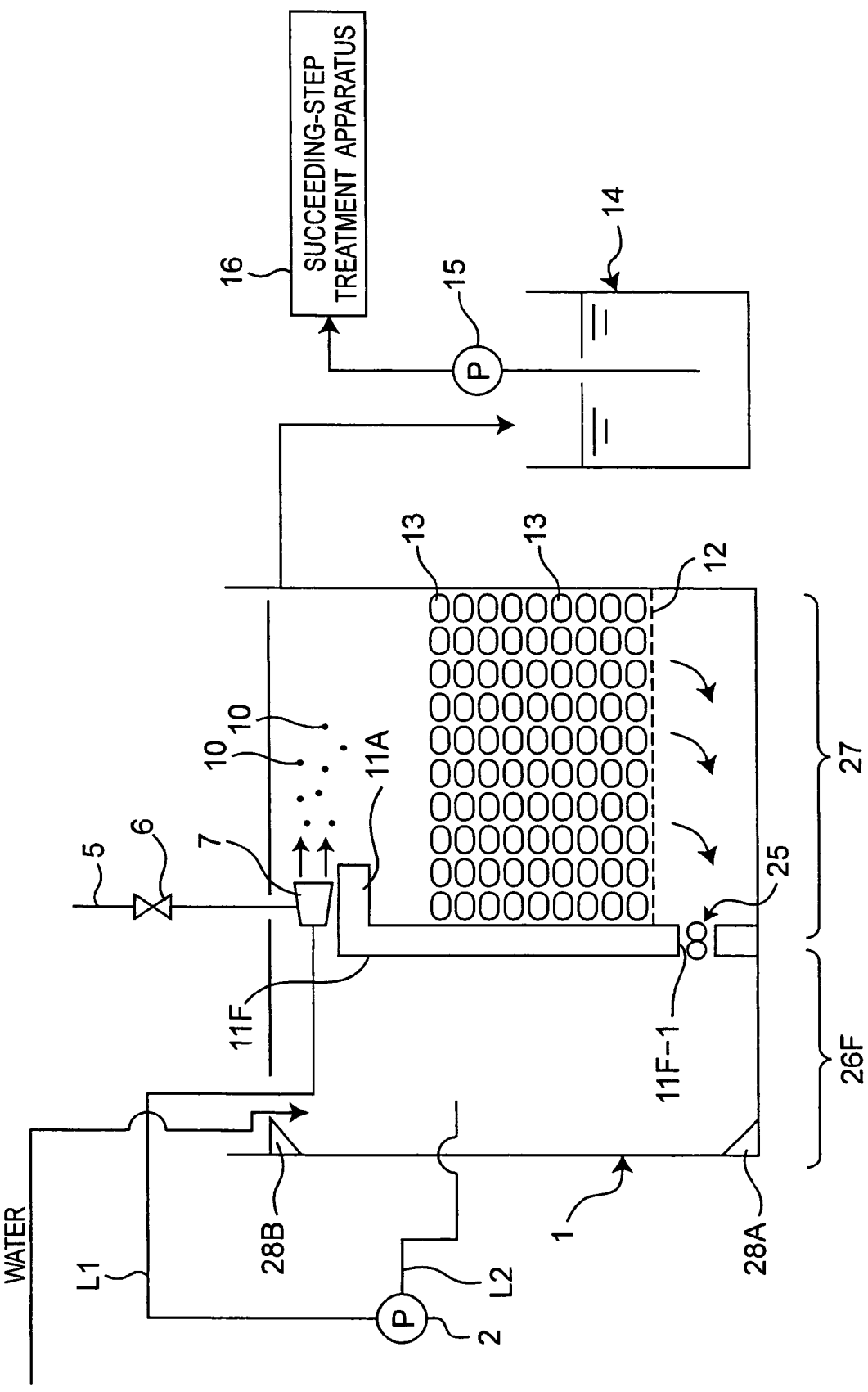

WATER TREATMENT METHOD AND WATER TREATMENT APPARATUS

CROSS-REFERENCE TO RELATED APPLICATIONS

This nonprovisional application claims priority under 35 U.S.C. §119(a) on Patent Application No. 2005-336826 filed in Japan on 22 Nov. 2005, the entire contents of which are incorporated herein by reference.

BACKGROUND OF THE INVENTION

The present invention relates to a water treatment method and a water treatment apparatus, for example, to a water treatment method and a water treatment apparatus for use in semiconductor factories and liquid crystal factories.

Treatment water contains organofluoric compounds as an example of compounds which are to be treated for water treatment. Organofluoric compounds are chemically stable substances. In particular, the organofluoric compounds have excellent properties from the viewpoints of heat resistance and chemical resistance, and therefore have been used for surface active agents or the like.

However, the organofluoric compounds, because they are chemically stable, are less easily microbially decomposable. For example, perfluorooctane sulfonate (PFOS) and perfluorooctanoic acid (PFOA) as such organofluoric compounds are less decomposed in ecosystems. This incurs a fear for bad influences on ecosystems.

Specifically, it is said that perfluorooctane sulfonate (PFOS) and perfluorooctanoic acid (PFOA) are so chemically stable as to need high temperatures of about 1000° C. or more for their complete thermal decomposition. Also, PFOS and PFOA have hitherto been quite difficult to decompose with conventional treatments using microorganisms, photocatalysts or the like.

As a prior art, a method and an apparatus using nanobubbles are disclosed in JP 2004-121962 A.

This prior art utilizes the properties of nanobubbles such as decreases in buoyancy, increases in surface area, increases in surface activity, generation of local high pressure, surface activation or bactericidal action due to implementation of electrostatic polarization. In more detail, the prior art has disclosed that inter-association of those properties allows various objects in polluted water to be cleaned with high function and low environmental load by virtue of its polluting-component adsorbing function, high-speed cleaning function for object surfaces and bactericidal action, thus being enabled to achieve purification of polluted water.

As another prior art, a generation method of nanobubbles is described in JP 2003-334548 A.

In this prior art, it is disclosed that the method includes the steps of, in a liquid: (1) decomposing part of the liquid into gas; (2) applying ultrasonic waves in the liquid; or (3) decomposing part of the liquid into gas and applying ultrasonic waves.

As another prior at, a waste fluid treatment apparatus using ozone microbubbles is described in JP 2004-321959 A.

In this prior art, ozone gas generated from an ozone generator as well as waste fluid drawn out from a lower portion of the treatment tank are fed to a microbubble generation device via a booster pump. In this prior art also, generated ozone microbubbles are fed into the waste fluid within the treatment tank through an opening of a gas blowout pipe.

However, organofluoric compounds cannot be effectively microbially decomposed by the foregoing prior art.

SUMMARY OF THE INVENTION

An object of the present invention is to provide a water treatment method and a water treatment apparatus which are continuous microbially decomposing organic matters contained in the treatment water.

To achieve the above-mentioned object, the present invention provides a water treatment method, comprising the steps of:

introducing treatment water, which is to be subjected to treatment, to a water treatment water tank having a charcoal charging section in which charcoal is charged;

making micro-nano bubbles contained in the treatment water;

propagating microorganisms on the charcoal; and treating the treatment water by the microorganisms propagated on the charcoal.

In this invention, microorganisms propagated on the charcoal are activated by micro-nano bubbles contained in the treatment water. Since the water treatment is carried out with those activated microorganisms propagated on the charcoal, a stable treatment is achieved and moreover organic matters adsorbed by the charcoal is decomposed by the activated microorganisms propagated on the charcoal. The decomposition of organic matters by the microorganisms goes as if charcoal were automatically regenerated. Thus, according to this invention, it is no longer necessary to do charcoal replacement work, so that the running cost can be reduced. As a consequence, according to the invention, the water treatment method is capable of microbially decomposing organofluoric compounds with high efficiency.

In one embodiment of the present invention, the water treatment method further comprises the step of generating a water stream of the treatment water within the water treatment water tank.

In this embodiment, the decomposition of organic matters by using microorganisms is accelerated by a water stream in the treatment water within the water treatment water tank.

The present invention also provides a water treatment apparatus comprising:

a water treatment water tank having a charcoal charging section into which treatment water to be subjected to treatment is introduced and in which charcoal is charged; and a micro-nano bubble generation section for making micro-nano bubbles contained in the treatment water.

In this invention, the microorganisms propagated on the charcoal are activated by micro-nano bubbles contained in the treatment water. Since the water treatment is carried out with those activated microorganisms propagated on the charcoal, a stable treatment is achieved and moreover organic matters adsorbed by the charcoal are decomposed by the activated microorganisms propagated on the charcoal. The decomposition of organic matters by the microorganisms goes as if charcoal were automatically regenerated. Thus, according to this water treatment apparatus, it is no longer necessary to do charcoal replacement work, so that the running cost is reduced. As a consequence, according to the water treatment apparatus, organofluoric compounds are microbially decomposed with high efficiency.

In one embodiment of the present invention, the water treatment apparatus further comprises a water stream generation section for generating a water stream of the treatment water in the water treatment water tank.

In this embodiment, the decomposition of organic matters by microorganisms is accelerated by occurrence of a water stream in the treatment water within the water treatment water tank. Thus, organofluoric compounds are microbially decomposed with high efficiency.

In one embodiment of the present invention, the charcoal contains at least one kind of charcoal selected from among three kinds of charcoal consisting of wood charcoal, activated carbon and synthetic charcoal.

In the water treatment apparatus of this embodiment, any one of wood charcoal, activated carbon and synthetic charcoal, having an adsorption function. Therefore, organic matters are adsorbed, and then those adsorbed organic matters are decomposed by the activated microorganisms. This maintains such a state as if charcoal were automatically regenerated.

In one embodiment of the present invention, the water stream generation section has a diffuser,
the water treatment water tank has a diaphragm which partitions the water stream generation section and the charcoal charging section from each other and which extends vertically, and
the micro-nano bubble generation section is placed on the diaphragm within the water treatment water tank.

In the water treatment apparatus of this embodiment, the water stream due to bubbles generated from the diffuser in the water stream generation section strengthen the water stream due to micro-nano bubbles generated by the micro-nano bubble generation section. Therefore, water in the water treatment water tank is internally agitated with a stronger water stream, so that the efficiency of organic matter treatment is enhanced. Also, since the micro-nano bubble generation section is placed on the diaphragm, that is, the micro-nano bubble generation section is placed close to the water surface of the water treatment water tank, it is possible to more easily verify the generation status of micro-nano bubbles in the water treatment water tank.

In one embodiment of the present invention, the charcoal charging section has a first charging section in which granular activated carbon is charged and a second charging section in which wood charcoal is charged.

In the water treatment apparatus of this embodiment, organic matters are adsorbed by both granular activated carbon and wood charcoal, and those adsorbed organic matters are decomposed by activated microorganisms. Also, since the charcoal charging section has a structure in which activated carbon and wood charcoal are combined together, larger amounts of organic matters to be treated are managed by increasing the amount of activated carbon in comparison to wood charcoal.

Moreover, microorganisms become more easily propagable on downstream-side wood charcoal in the case where the first charging section with granular activated carbon charged therein is placed on the upstream side within the water treatment water tank and the second charging section with wood charcoal charged therein is placed on the downstream side within the water treatment water tank.

In one embodiment of the present invention, the charcoal charging section has reticulate tubes placed in adjacency to the charcoal.

In the water treatment apparatus of this embodiment, in which the charcoal charging section has reticulate tubes placed in adjacency to the charcoal, even if abnormal propagation of microorganisms have occurred, the microorganisms abnormally propagating on the charcoal are introduced into the reticulate tubes, by which the charcoal is prevented from blockage by the microorganisms.

In one embodiment of the present invention, the charcoal charging section has: a first charging section in which calcium carbonate mineral is charged, and a second charging section in which wood charcoal is charged.

In the water treatment apparatus of this embodiment, upon a fall of pH of the treatment water in the water treatment water tank, pH of the treatment water is controlled without using any chemicals by the dissolution of the calcium carbonate mineral of the first charging section included in the charcoal charging section. That is, the dissolution of calcium carbonate mineral allows neutralization to be achieved. Also, since biological membranes are formed on the surfaces of the calcium carbonate mineral, further treatment of organic matters is fulfilled by the biological membranes.

In one embodiment of the present invention, the charcoal charging section has: an upper section which contains polyvinylidene chloride filler material, an intermediate section which contains granular activated carbon, and a lower section which contains wood charcoal.

In this embodiment, when a large amount of microorganisms have occurred in the water treatment water tank, microorganisms adhere to the upper polyvinylidene chloride filler material. Therefore, the granular activated carbon in the intermediate section and the wood charcoal in the lower section are prevented from being blocked by microorganisms, which allows the water treatment to be continued. In the case where the treatment water is reuse water in a semiconductor factory as an example, solvents may mix into the treatment water from time to time, so that microorganisms may occur in large amounts.

In one embodiment of the present invention, the water treatment apparatus further comprises an activated carbon adsorption tower into which the treatment water derived from the water treatment water tank is introduced.

In this embodiment, organic matters contained in the treatment water are adsorbed by both charcoal within the water treatment water tank and activated carbon of the activated carbon adsorption tower. Besides, microorganisms propagated on the charcoal and the activated carbon are activated by the micro-nano bubbles. Therefore, the microbial treatment is further accelerated. Thus, even when the treatment water is secondary treatment water containing organofluoric compounds, which are generally extremely poor in microorganisms decomposability, decomposition treatment is carried out by microorganisms.

In one embodiment of the present invention, the water stream generation section has a submerged agitator,
the water treatment water tank has a diaphragm which partitions the charcoal charging section and the water stream generation section from each other and which extends vertically, and
the micro-nano bubble generation section is placed on the diaphragm, and the submerged agitator is placed at a through portion formed at a lower portion of the diaphragm.

In this embodiment, generation of a water stream and agitation are performed in upper part of the water treatment water tank by micro-nano bubbles generated by the micro-nano bubble generation section placed on the diaphragm of the water treatment water tank. Further, generation of a water stream and agitation are performed in lower part of the water treatment water tank by the submerged agitator placed at a lower portion of the diaphragm. That is, generation of a water stream and agitation are performed in both places above and below in the water treatment water tank, the generation of a water stream and agitation within the water treatment water tank are smoothly carried out, so that the efficiency of water treatment can be improved.

In one embodiment of the present invention, the treatment water introduced into the water treatment water tank contains organofluoric compounds.

In this embodiment, organofluoric compounds, which are extremely hard to microbially decompose, are adsorbed by the charcoal charged in the charcoal charging section. Thereafter, the adsorbed organofluoric compounds are decomposed by the activated microorganisms propagated on the charcoal. Thus, it is possible to decompose organofluoric compounds that could not conventionally been microbially decomposed.

In one embodiment of the present invention, the organofluoric compounds are perfluorooctane sulfonate or perfluorooctanoic acid or a mixture of perfluorooctane sulfonate and perfluorooctanoic acid.

In this embodiment, it is possible to decompose perfluorooctane sulfonate (PFOS) or perfluorooctanoic acid (PFOA) or a mixture of PFOS and PFOA as organofluoric compounds that could not conventionally been microbially decomposed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view schematically showing a water treatment apparatus in a seventh embodiment of the present invention.

DETAILED DESCRIPTION OF THE INVENTION

Hereinbelow, the present invention will be described in detail by embodiments thereof illustrated in the accompanying drawings.

First Embodiment

Figure 1:
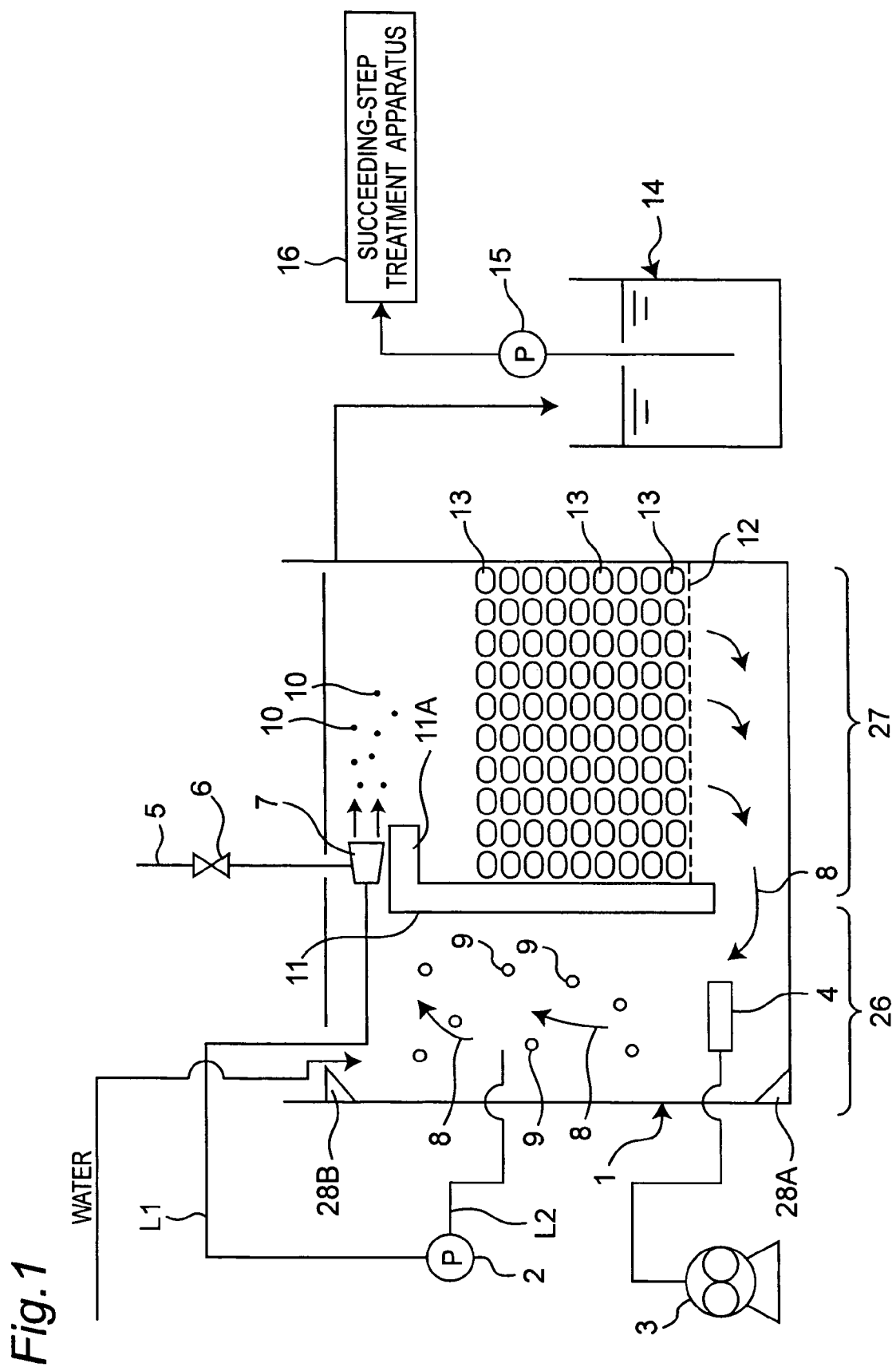
FIG. 1 is a view schematically showing a water treatment apparatus in a first embodiment of the present invention.

FIG. 1 is a view schematically showing a water treatment apparatus in a first embodiment of the present invention.

In FIG. 1, reference numeral 1 denotes a water treatment water tank, to which treatment water, i.e. water to be treated, is introduced.

The water treatment water tank 1 includes a water stream generation section 26 and a charcoal charging section 27, where the water stream generation section 26 and the charcoal charging section 27 are partitioned from each other by a hooked diaphragm 11. This hooked diaphragm 11 is spaced from a bottom of the water tank 1 with a specified distance, and the water stream generation section 26 and the charcoal charging section 27 are communicated with each other between the hooked diaphragm 11 and the bottom of the water tank 1.

In the water stream generation section 26, a diffuser 4 is placed at a lower portion, and the diffuser 4 is connected to a blower 3 placed outside the water tank 1. The diffuser 4 discharges bubbles 9 (air bubbles) to generate a water stream 8, which is an ascending current, in the treatment water of the water stream generation section 26. Meanwhile, the hooked diaphragm 11 has a horizontal portion 11A horizontally bent at an upper end, and a micro-nano bubble generator 7 as a micro-nano bubble generation section is placed on the horizontal portion 11A. A pipe L1 is connected to the micro-nano bubble generator 7, and the pipe L1 is connected to a circulating pump 2 placed outside the water tank 1. The circulating pump 2 supplies the treatment water in the water stream generation section 26 to the micro-nano bubble generator 7 through pipes L2, L1. Also, an air suction pipe 5 having a valve 6 is connected to the micro-nano bubble generator 7, and air is supplied through the air suction pipe 5 via the valve 6 to the micro-nano bubble generator 7. The amount of air supplied to the micro-nano bubble generator 7 can be controlled by the valve 6. The micro-nano bubble generator 7 generates micro-nano bubbles 10 toward the charcoal charging section 27. The micro-nano bubbles 10 generate a water stream which is weaker than the water stream resulting from the bubbles 9 discharged by the diffuser 4.

In addition, a triangular member 28A is placed at a corner formed by a lower end of a side wall of the water tank 1 within the water stream generation section 26 and the bottom of the water tank 1, while another triangular member 28B is placed at an upper portion of side wall of the water tank 1 within the water stream generation section 26. Sloped surfaces of these two triangular members 28A, 28B serve as guide surfaces for the water stream within the water stream generation section 26 so that the circulation of the treatment water between the water stream generation section 26 and the charcoal charging section 27 can be accelerated.

In this embodiment, in the water treatment water tank 1, the treatment water in the water treatment water tank 1 is agitated effectively by a water stream formed by the bubbles 9 generated by the diffuser 4 and the micro-nano bubbles generated by the micro-nano bubble generator 7. Accordingly, in the water treatment water tank 1, the treatment water and wood charcoal 13 filled in the charcoal charging section 27 are brought into an efficiently contacting state.

In the charcoal charging section 27, on the other hand, a net 12 is placed to support a plural pieces of filled wood charcoal 13 and to form a space in lower part. Of course, a reinforcing material (not shown) for supporting the load of the wood charcoal 13 is incorporated in the net 12.

In this embodiment, the treatment water is, for example, service water, waste water and reuse water.

The micro-nano bubble generator 7 generates a water stream due to micro-nano bubbles to enhance the contact efficiency between the treatment water and the wood charcoal 13 having microorganisms propagating thereon. However, only with the water stream due to the micro-nano bubbles, the amount of circulating water is insufficient to generate a circulating flow of the treatment water in the water treatment water tank 1. For this reason, most of the amount the circulating water in the water treatment water tank 1 depends on an ascending water stream 8 which is generated as the bubbles 9 discharged from the diffuser 4 ascend. This ascending water stream 8 becomes a circulating flow by so-called air lift. The diffuser 4, which is coupled to the blower 3 by piping, generates normal bubbles 9 due to air supplied from the blower 3, causing the water stream 8 to occur.

The micro-nano bubble generator 7 is supplied with a necessary amount of circulating water by the circulating pump 2, while a necessary amount of air for the micro-nano bubble generator 7 is controlled by the air suction pipe 5 and the valve 6, so that optimum micro-nano bubbles are generated.

As already described, the micro-nano bubble generator 7 is placed at the horizontal portion 11A forming an upper portion of the hooked diaphragm 11. The hooked diaphragm 11 functions to guide the flow direction of the water stream in a certain direction from the water stream generation section 26 toward the charcoal charging section 27, and further serves as a placement site for the micro-nano bubble generator 7. The micro-nano bubble generator 7 is placed at the horizontal portion 11A forming an upper portion of the hooked diaphragm 11, thus being close to the water surface of the water tank 1 and having a merit that the state of generation of micro-nano bubbles can be verified by the unaided eye.

In this embodiment, water containing organic matters as the treatment water is introduced to the water treatment water tank 1, where micro-nano bubbles are generated, followed by apparatus operation. As a result, as time elapses, activated microorganisms propagate on the wood charcoal 13 of the charcoal charging section 27. Although the wood charcoal 13 basically has a capability of adsorbing organic matters, yet activated microorganisms propagate on the wood charcoal 13 that has adsorbed organic matters, and therefore organic matters adsorbed in the wood charcoal 13 can be decomposed by the activated microorganisms. In particular, organofluoric compounds, which have been said to be difficult to microbially decompose, are first adsorbed by the wood charcoal 13 and then decomposed by activated microorganisms. In this way, organic matters such as organofluoric compounds are decomposed. In the charcoal charging section 27 of the water treatment water tank 1, adsorption and decomposition of organic matters are iterated in short time. Thus, the wood charcoal 13 is kept in a regenerated state at all times.

It is noted that the micro-nano bubble generator 7 may be any one commercially available without limitations of manufacturers. In this embodiment, specifically, those manufactured by Nanoplanet Research Institute Corporation, Aura Tec Co., Ltd and Nomura Electric Industries Co., Ltd are adopted for example. Among other commercial products are, for example, micro-nano bubble generators manufactured by SEIKA CORPORATION and microbubble generators manufactured by Shigen Kaihatsu K. K., where any one may be selected according to their purposes.

In the water treatment water tank 1, organic matters contained in the treatment water are rationally treated as described above, enter into a pit 14 and subsequently introduced to a succeeding-step treatment apparatus 16 by a transfer pump 15 placed at the pit 14. It is conceivable to equip the succeeding-step treatment apparatus 16 with, for example, an activated carbon adsorption tower (not shown) or a membrane separation unit (not shown) as an example of further advanced treatment according to purposes, where various types of treatment units may be selected according to purposes.

Description is now given of three kinds of bubbles.

(i) Normal bubbles ascend in water, and upon reaching the surface, they burst with a pop and disappear.

(ii) Microbubbles are microscopic bubbles having diameters not more than 50 μm (microns), and part of the microbubbles shrink in the water to finally disappear (total dissolution).

(iii) Nanobubbles are bubbles (having diameters of 100 to 200 nm, which are not more than 1 μm), even smaller than microbubbles. It is said that those nanobubbles can exist in the water endlessly.

Micro-nano bubbles are said to be bubbles in which microbubbles and nanobubbles are mixed together.

Although the wood charcoal 13 is adopted as the charcoal in the foregoing embodiment, yet activated carbon or synthetic charcoal may be used instead of wood charcoal, where two or more kinds of charcoal selected from among wood charcoal, activated carbon and synthetic charcoal may be combined. Also, although the diaphragm 11 is a hooked type one in the foregoing embodiment, the shape of the diaphragm 11 is, of course, not limited to the hooked type, and the diaphragm 11 may be a straight-shaped or T-like shaped one. Also needless to say, the placement site for the micro-nano bubble generator 7 is not limited to on the diaphragm 11, and may be placed at the water stream generation section 26 or the charcoal charging section 27.

Second Embodiment

Figure 2:
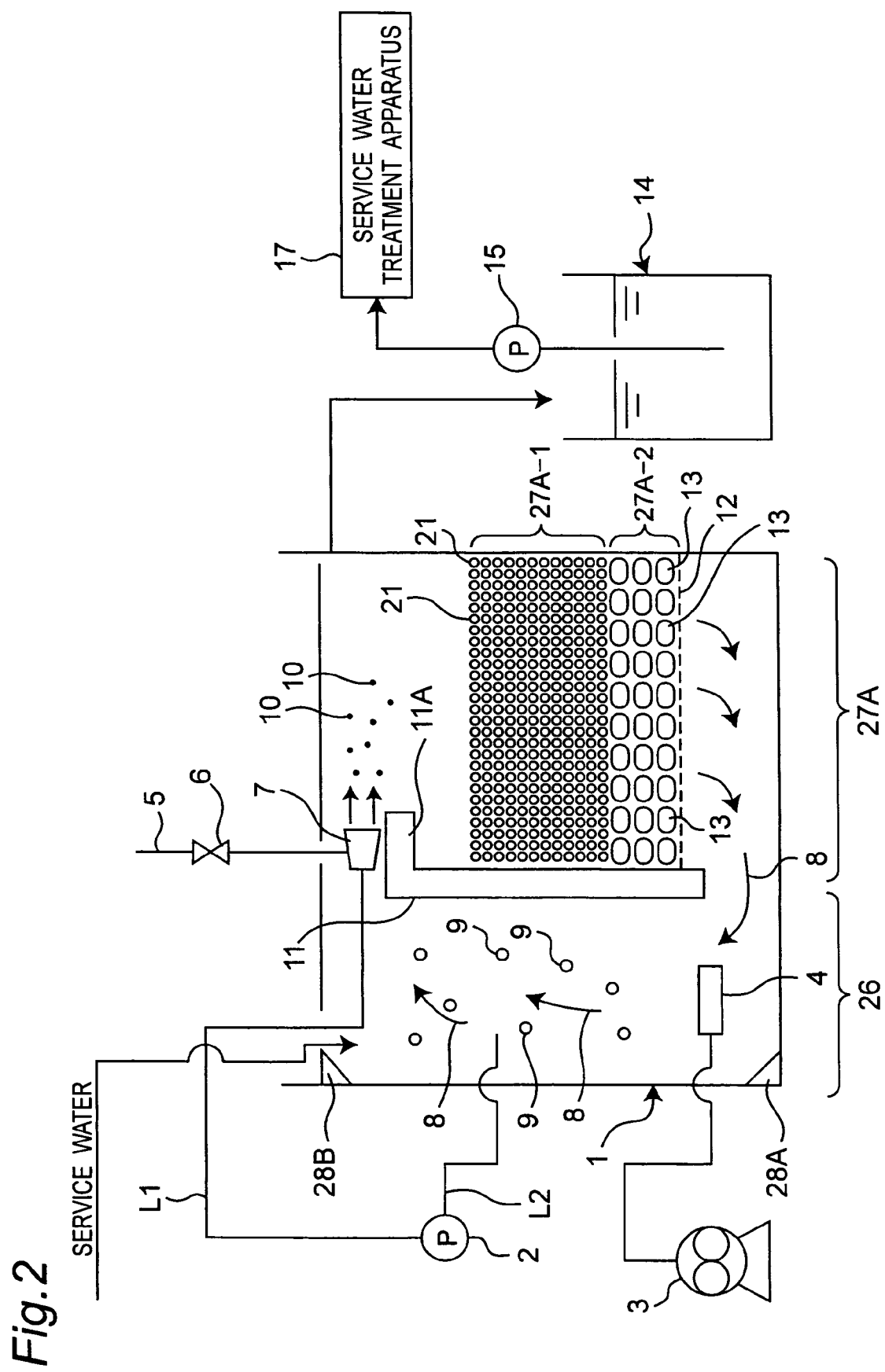
FIG. 2 is a view schematically showing a water treatment apparatus in a second embodiment of the present invention.

FIG. 2 shows a water treatment apparatus in a second embodiment of the present invention. In this second embodiment, the treatment water is service water. Also, the second embodiment differs from the foregoing first embodiment in that a charcoal charging section 27A having an upper charging section 27A-1 and a lower charging section 27A-2 is included instead of the charcoal charging section 27, and that a service water treatment apparatus 17 is included instead of the succeeding-step treatment apparatus 16. Therefore, in the second embodiment, the same parts as in the first embodiment are designated by the same reference numerals, their detailed description being omitted, and different parts from the first embodiment will be described below.

In the second embodiment, unlike the charcoal charging section 27 of the first embodiment, in which the total amount of charcoal is given by the wood charcoal 13, the charcoal charging section 27A of the water treatment water tank 1 has an upper charging section 27A-1 as the first charging section in which granular activated carbon 21 are charged, and a lower charging section 27A-2 as the second charging section in which the wood charcoal 13 is charged.

In this second embodiment, the treatment water is service water. That is, the service water refers to, for example, service water to be used in semiconductor factories or liquid crystal factories, and raw water before manufacture of ultrapure water is adopted as an example. Also, in provision for cases where the treatment water is service water for ultrapure water, granular activated carbon 21 is charged in the upper charging section 27A-1 and the wood charcoal 13 is charged in the lower charging section 27A-2, unlike the case where the total amount of the charcoal is given by the wood charcoal 13.

The granular activated carbon 21 charged in the upper charging section 27A-1 is higher than wood charcoal in terms of the capability of adsorbing organic matters in the treatment water. In the second embodiment, the succeeding-step treatment apparatus 16 of the first embodiment is replaced with the more actual service water treatment apparatus 17. Then, the water treatment water tank 1 serves as a pretreatment water treatment for the service water treatment apparatus 17.

In this second embodiment, organic matters contained in the service water as the treatment water introduced into the water treatment water tank 1 are adsorbed by the granular activated carbon 21 and the wood charcoal 13 in the charcoal charging section 27A. Then, since microorganisms activated by micro-nano bubbles propagate also on the granular activated carbon 21 and the wood charcoal 13, the organic matters adsorbed by the granular activated carbon 21 and the wood charcoal 13 are decomposed by the activated microorganisms. That is, in the charcoal charging section 27A, adsorption and decomposition of organic matters are iterated in short time in the granular activated carbon 21 and the wood charcoal 13. Thus, the granular activated carbon 21 and the wood charcoal 13 in the charcoal charging section 27A are kept in a regenerated state at all times. The treatment water treated in the water treatment water tank 1 is introduced to the service water treatment apparatus 17 by the transfer pump 15, and subjected to treatment.

The granular activated carbon 21 is placed above and the wood charcoal 13 is placed below in the charcoal charging section 27 in this second embodiment. However, it is also possible that the wood charcoal 13 is placed above and the granular activated carbon 21 is placed below, conversely.

Third Embodiment

Figure 3:
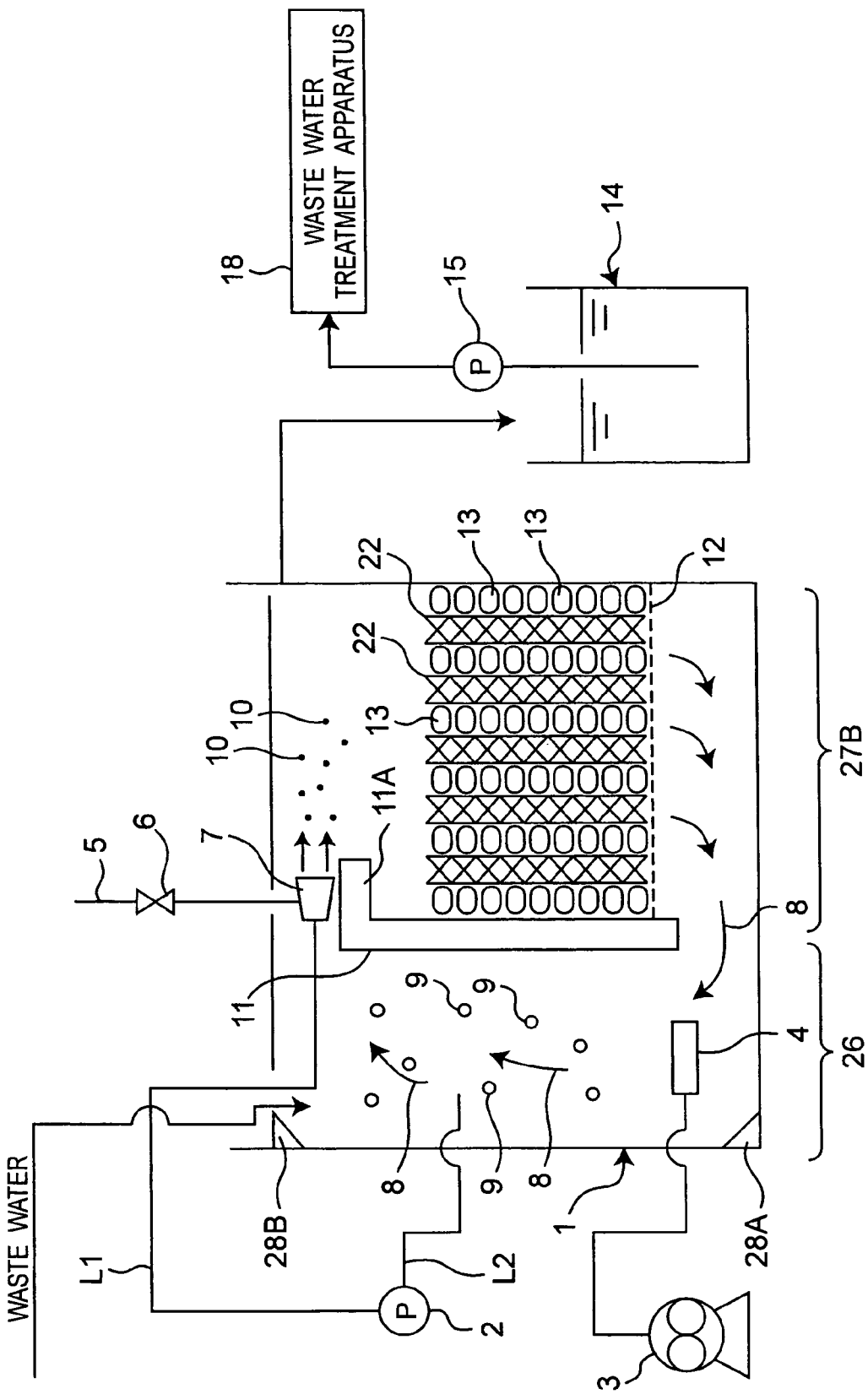
FIG. 3 is a view schematically showing a water treatment apparatus in a thrid embodiment of the present invention.

FIG. 3 shows a water treatment apparatus in a thrid embodiment of the present invention. The third embodiment differs from the foregoing first embodiment in that a charcoal charging section 27B is included instead of the charcoal charging section 27 of FIG. 1, a waste water treatment apparatus 18 is included instead of the succeeding-step treatment apparatus 16 of FIG. 1, and that the treatment water is waste water. Therefore, in the third embodiment, the same parts as in the first embodiment are designated by the same reference numerals, their detailed description being omitted, and different parts from the first embodiment will be described below.

In the third embodiment, the charcoal charging section 27B of the water treatment water tank 1 has wood charcoal 13, and reticulate tubes 22 placed adjacent to the wood charcoal 13. The wood charcoal 13 and the reticulate tubes 22 are placed on the net 12 transversely alternately.

In the case where the treatment water is waste water as in the third embodiment, since the waste water generally contains suspended matters in many cases, measures need to be taken for the possibility that the wood charcoal 13 charged in the charcoal charging section 27B may be blocked by the suspended matters.

In this third embodiment, as the measures for that blockage, the reticulate tubes 22 extending in a longitudinal direction (vertical direction), which is the same direction as the water stream, are placed in the charcoal charging section 27B so as to be adjacent to the wood charcoal 13. In the charcoal charging section 27B, the suspended matters contained in the waste water can be made to flow through the reticulate tubes 22, so that the wood charcoal 13 can be prevented from being blocked by the suspended matters. Also, in case the microorganisms abnormally propagate on the wood charcoal 13, the microorganisms abnormally propagating on the wood charcoal 13 are introduced into the reticulate tubes 22, by which the wood charcoal 13 can be prevented from blockage by the microorganisms.

These reticulate tubes 22 are used as a contact material for the field of waste water treatment, and several products made from such materials as vinyl chloride or polyethylene are commercially available. In addition, also on the surfaces of the reticulate tubes 22, microorganisms activated by micro-nano bubbles propagate to form biological membranes, lending themselves to the treatment of organic matters in the waste water. Then, the treatment water treated in the water treatment water tank 1 is introduced by the transfer pump 15 to the waste water treatment apparatus 18, and subjected to specified water treatment.

Fourth Embodiment

Figure 4:
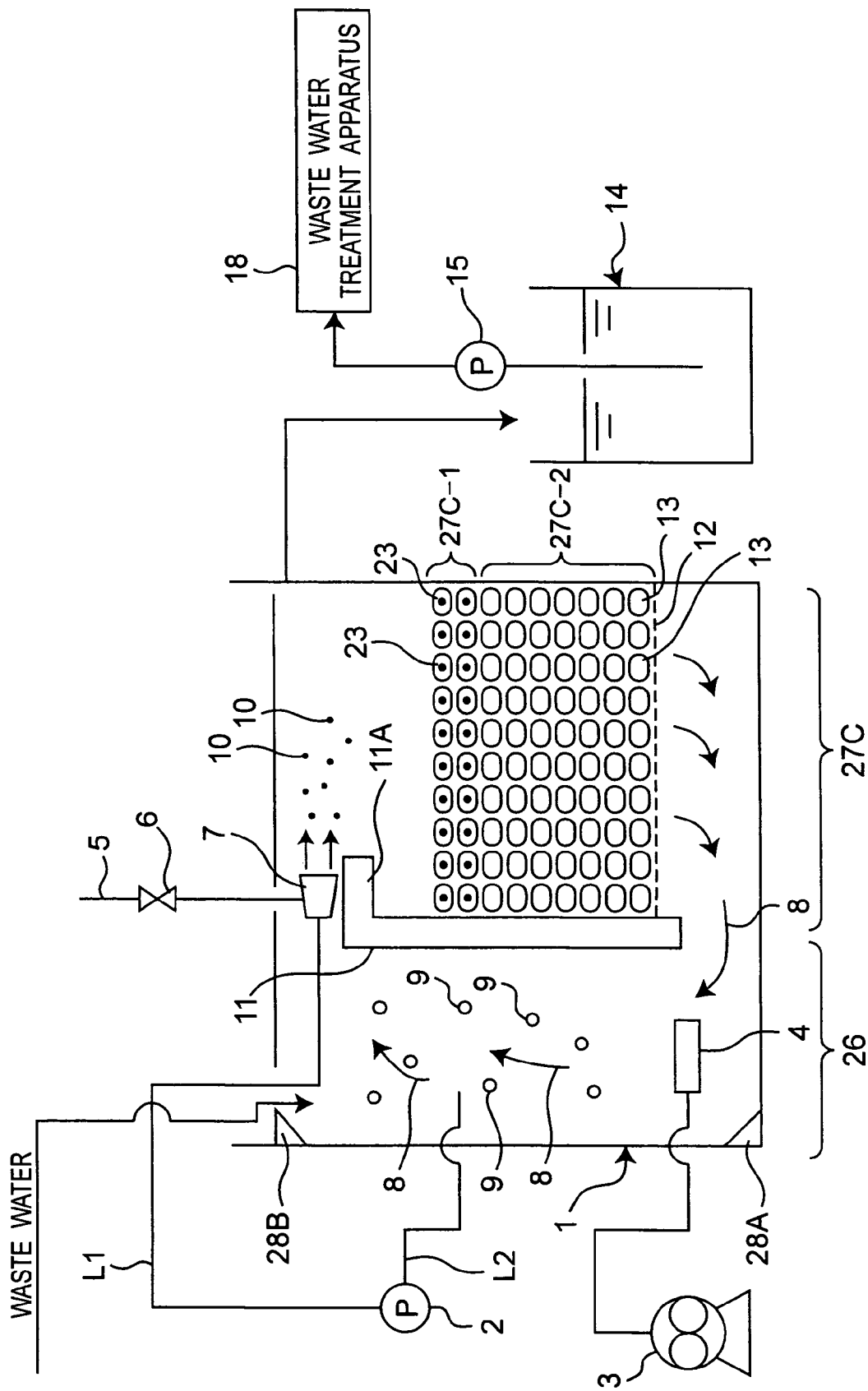
FIG. 4 is a view schematically showing a water treatment apparatus in a fourth embodiment of the present invention.

FIG. 4 shows a water treatment apparatus in a fourth embodiment of the present invention. The fourth embodiment differs from the foregoing first embodiment in that a charcoal charging section 27C is included instead of the charcoal charging section 27 of the first embodiment, a waste water treatment apparatus 18 is included instead of the succeeding-step treatment apparatus 16, and that the treatment water is waste water. Therefore, in the fourth embodiment, the same parts as in the first embodiment are designated by the same reference numerals, their detailed description being omitted, and different parts from the first embodiment will be described below.

In the fourth embodiment, the charcoal charging section 27C of the water treatment water tank 1 has an upper portion 27C-1 as the first charging section in which calcium carbonate mineral 23 is charged, and a lower portion 27C-2 as the second charging section in which the wood charcoal 13 is charged. These lower portion 27C-2 and upper portion 27C-1 are stacked one by one on the net 12.

In this fourth embodiment, in the case where organic matters containing nitrogen in the waste water are oxidized by microorganisms propagating on the wood charcoal 13 and activated by micro-nano bubbles in the charcoal charging section 27C, nitrate nitrogen increases and pH of the treatment water lowers. Therefore, as a neutralizer therefor, the calcium carbonate mineral 23 is placed in the charcoal charging section 27C.

The microorganisms activated by micro-nano bubbles propagate also on the surfaces of the calcium carbonate mineral 23, by which biological membranes are formed on the surfaces of the calcium carbonate mineral 23 and the treatment of organic matters is fulfilled by the biological membranes. Then, the treatment water treated in the water treatment water tank 1 is introduced by the transfer pump 15 further to the waste water treatment apparatus 18 and subjected to further treatment.

The calcium carbonate mineral 23, specifically, may be marble, white marble, oyster shell, coral or the like, any one among which may be selected according to purposes. Also, the calcium carbonate mineral 23 of the charcoal charging section 27C may be placed between the wood charcoal 13 and the net 12. That is, in the charcoal charging section 27C, it is also possible that the wood charcoal 13 is placed below and the calcium carbonate mineral 23 is placed above. The changing ratio of the calcium carbonate mineral 23 to the wood charcoal 13 may be determined according to pH of the treatment water.

Fifth Embodiment

Figure 5:
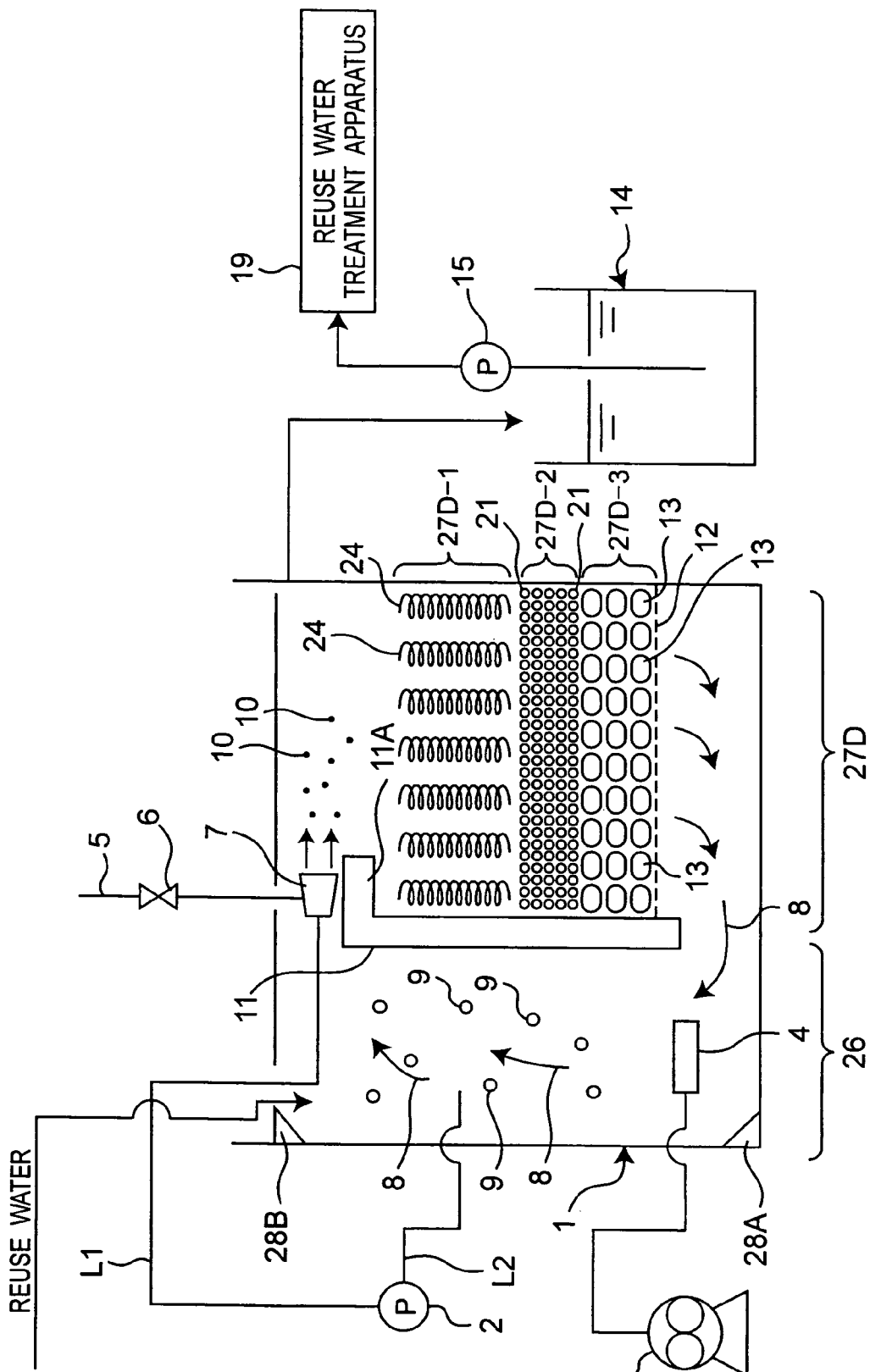
FIG. 5 is a view schematically showing a water treatment apparatus in a fifth embodiment of the present invention.

FIG. 5 shows a fifth embodiment of the invention. This fifth embodiment differs from the foregoing first embodiment in that a charcoal charging section 27D is included instead of the charcoal charging section 27 of FIG. 1, a reuse water treatment apparatus 19 is included instead of the succeeding-step treatment apparatus 16 of FIG. 1, and that the treatment water is reuse water. Therefore, in the fifth embodiment, the same parts as in the first embodiment are designated by the same reference numerals, their detailed description being omitted, and different parts from the first embodiment will be described below.

In the fifth embodiment, the charcoal charging section 27D of the water treatment water tank 1 has an upper section 27D-1 filled with polyvinylidene chloride filler material 24, an intermediate section 27D-2 filled with granular activated carbon 21, and a lower section 27D-3 filled with the wood charcoal 13.

In the case where isopropyl alcohol flows and mixes into the reuse water in a semiconductor factory as an example, abnormal propagation of microorganisms may occur in the charcoal charging section 27, which is charged with only the wood charcoal 13 as the charcoal, as in the foregoing first embodiment. This fifth embodiment is to provide for the abnormal propagation of microorganisms.

More specifically, in the fifth embodiment, the charcoal charging section 27D includes a polyvinylidene chloride filler material 24 of the upper section 27D-1, granular activated carbon 21 of the intermediate section 27D-2, and wood charcoal 13 of the lower section 27D-3. Therefore, even if isopropyl alcohol has flowed and mixed into the reuse water so that microorganisms have abnormally propagated, the microorganisms adhere to the polyvinylidene chloride filler material 24. Thus, the abnormal propagation of microorganisms have no influences on the granular activated carbon 21 of the intermediate section 27D-2 or the wood charcoal 13 of the lower section 27D-3. Further, since the microbial treatment by microorganisms that have adhered to and propagated on the polyvinylidene chloride filler material 24 functions as the pretreatment for the granular activated carbon 21 of the intermediate section 27D-2 and the wood charcoal 13 of the lower section 27D-3, the phenomenon that the granular activated carbon 21 and the wood charcoal 13 are blocked by microorganisms can be prevented.

Then, in the fifth embodiment, the treatment water treated in the water treatment water tank 1 is introduced by the transfer pump 15 to the reuse water treatment apparatus 19 and subjected to further water treatment.

Sixth Embodiment

Figure 6:
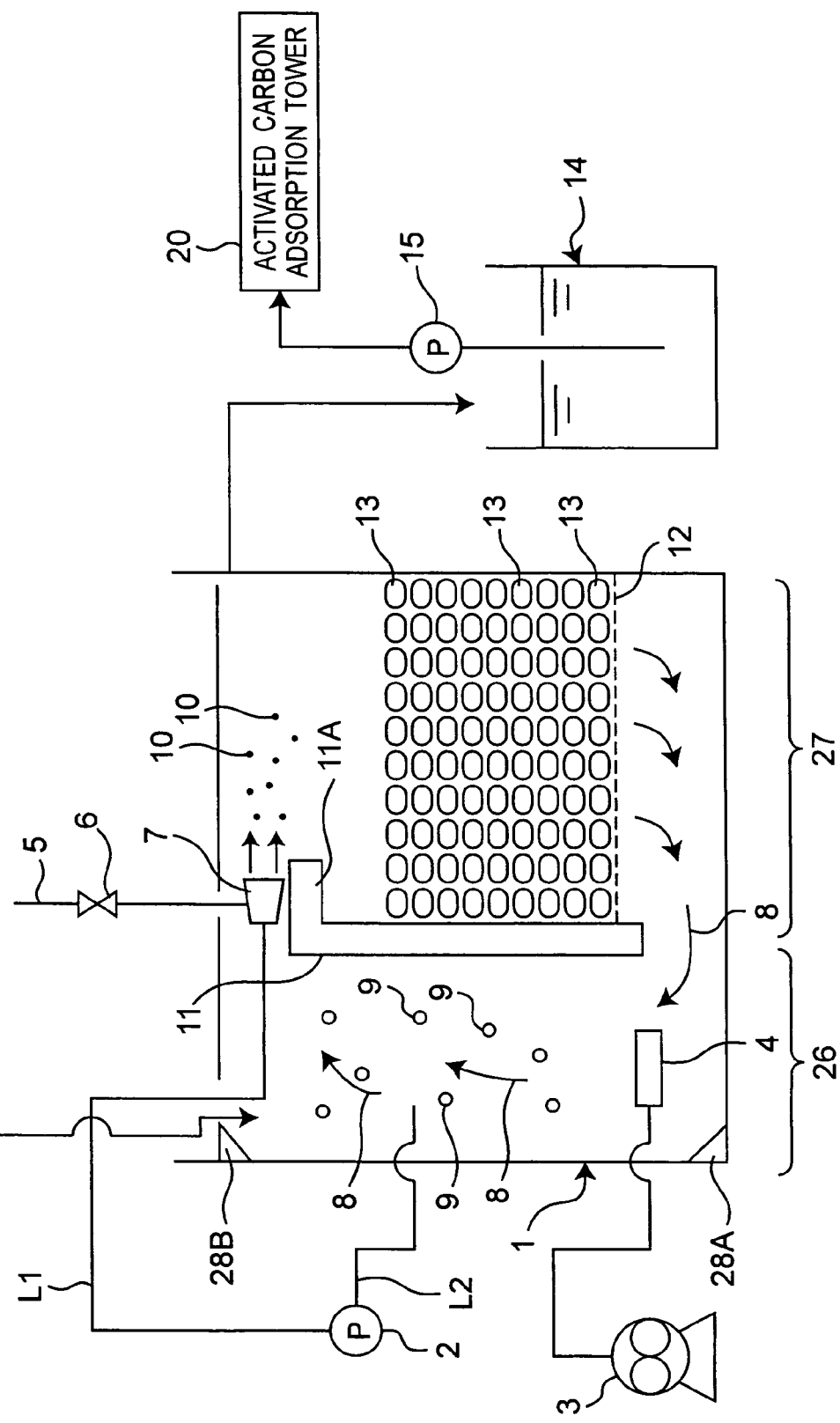
FIG. 6 is a view schematically showing a water treatment apparatus in a sixth embodiment of the present invention.

FIG. 6 shows a water treatment apparatus in a sixth embodiment of the present invention. The sixth embodiment differs from the foregoing first embodiment in that the treatment water introduced to the water treatment water tank 1 is secondary treatment water of waste water containing organofluoric compounds, and that an activated carbon adsorption tower 20 is included instead of the succeeding-step treatment apparatus 16. Therefore, in the sixth embodiment, different parts from the first embodiment will be described below.

The secondary treatment water of waste water containing organofluoric compounds, which is the treatment water in this sixth embodiment is, for example, secondary treatment water of development waste water in semiconductor factories. Organofluoric compounds are extremely hard to microbially decompose. Due to this, conventionally, no reliable method has been available but a method of incineration at 1000° C. or higher as the method for treating waste water containing organofluoric compounds.

In contrast to this, including two water treatment units, i.e. the water treatment water tank 1 having the micro-nano bubble generator 7 and the wood charcoal 13 and the activated carbon adsorption tower 20 as in the sixth embodiment makes it possible to provide reliable measures. That is, organofluoric compounds in the waste water are subjected first to microbial decomposition (primary decomposition) by microorganisms adsorbed to the wood charcoal 13 and activated by micro-nano bubbles. Then, the treatment water is further introduced by the transfer pump 15 from the water treatment water tank 1 to the activated carbon adsorption tower 20, where organofluoric compounds are adsorbed by activated carbon. Thereafter, the organofluoric compounds are reliably decomposed by the microorganisms that have propagated on and activated by the activated carbon of the activated carbon adsorption tower 20. In the sixth embodiment, since absolutely no consumption of the fuel is involved, there is provided a waste water treatment apparatus that is environment-friendly and epoch-making in comparison to conventional incineration methods.

Seventh Embodiment

FIG. 7 shows a water treatment apparatus in a seventh embodiment of the present invention. The seventh embodiment differs from the foregoing first embodiment in that the water treatment water tank 1 has a diaphragm 11F instead of the diaphragm 11 of the foregoing first embodiment and a water stream generation section 26F instead of the water stream generation section 26. Therefore, in the seventh embodiment, the same parts as in the first embodiment are designated by the same reference numerals, their detailed description being omitted, and different parts from the first embodiment will mainly be described below.

In the seventh embodiment, the water stream generation section 26F has a submerged agitator 25 instead of the diffuser 4 and the blower 3. The submerged agitator 25 is placed at a through portion 11F-1 formed at a lower portion of the diaphragm 11F. The through portion 11F-1 is communicated with the water stream generation section 26F and the charcoal charging section 27.

In this seventh embodiment, unlike the agitation by an ascending current of air discharged by the diffuser 4 as in the foregoing first embodiment, a water stream circulating through the water stream generation section 26F and the charcoal charging section 27 is generated by agitation with the submerged agitator 25 placed at the through portion 11F-1 of the lower portion of the hooked diaphragm 11F.

In terms of agitation efficiency, agitation by air discharged by a diffuser and agitation by a submerged agitator show agitating action of levels generally equal to each other. However, in terms of energy to be consumed, the first embodiment, which adopts an agitation method by a diffuser, allows an energy saving to be achieved. Thus, desirably, the submerged agitator 25 is selected according to purposes, for example, in the case where oxygen should be avoided in water treatment within the water treatment water tank 1.

Experimental Example

An experiment apparatus corresponding to the water treatment apparatus in the first embodiment of FIG. 1 was manufactured. However, the succeeding-step treatment apparatus 16 was replaced with the activated carbon adsorption tower 20. In this experiment apparatus, the water treatment water tank 1 had a capacity of about 4 m$^3$, the pit 14 had a capacity of about 0.2 m$^3$, and the activated carbon adsorption tower 20 had a capacity of 0.6 m$^3$. Then, in this experiment apparatus, with industrial water introduced to the water treatment water tank 1, the pit 14 and the activated carbon adsorption tower 20, a trial run was made for one month. After this trial run, a TOC (Total Organic Carbon) concentration at the entrance to the water treatment water tank 1 and a TOC (Total Organic Carbon) concentration at the exit of the activated carbon adsorption tower 20 were measured, and a TOC removal ratio was measured, by which a result of 85% was obtained.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A water treatment apparatus comprising:
a water treatment water tank having a charcoal charging section, a water stream generation section and a micro-nano bubble generation section,
said charcoal charging section being constructed to contain a charcoal charge and said charcoal charging section being constructed and arranged to receive treatment water which is to be subjected to treatment; and
said water stream generation section contains a diffuser; and
said a micro-nano bubble generation section comprising a micro-nano bubble generator,
wherein
the water treatment tank further comprises a diapharm which partitions the water stream generation section and the charcoal changing section from each other and which extends vertically, and
the micro-nano bubble generation section is placed on the diaphragm within the water treatment tank.

2. A water treatment apparatus comprising:
a water treatment water tank having a charcoal charging section which is constructed to contain a charcoal charge and said charcoal charging section being constructed and arranged to receive treatment water which is to be subjected to treatment; and
a micro-nano bubble generation section comprising a micro-nano bubble generator,
wherein
the charcoal charging section has
a first charging section in which granular activated carbon is charged and a second charging section in which wood charcoal is charged.

3. A water treatment apparatus comprising:
a water treatment water tank having a charcoal charging section which is constructed to contain a charcoal charge and said charcoal charging section being constructed and arranged to receive treatment water which is to be subjected to treatment; and
a micro-nano bubble generation section comprising a micro-nano bubble generator,
wherein
the charcoal charging section has:
an upper section which contains polyvinylidene chloride filler material,
an intermediate section which contains granular activated carbon, and
a lower section which contains wood charcoal.

4. A water treatment apparatus comprising:
a water treatment water tank having a charcoal charging section, a water stream generation section and a micro-nano bubble generation section,
said charcoal charging section being constructed to contain a charcoal charge and said charcoal charging section being constructed and arranged to receive treatment water which is to be subjected to treatment; and
said micro-nano bubble generation section comprises a micro-nano bubble generator, wherein
the water stream generation section has an agitator arranged such that said agitator is submerged in operation of said apparatus,
the water treatment water tank has a diaphragm which partitions the charcoal charging section and the water stream generation section from each other and which extends vertically, and
the micro-nano bubble generation section is placed on the diaphragm, and the agitator is placed at a through portion formed at a lower portion of the diaphragm.

5. The water treatment apparatus as set forth in claim 1 or 4, wherein the charcoal contains at least one kind of charcoal selected from the group consisting of wood charcoal, activated carbon and synthetic charcoal.

6. The water treatment apparatus as set forth in any one of claims 1, 2, 3 and 4, wherein
the charcoal charging section has reticulate tubes placed in adjacency to the charcoal.

7. The water treatment apparatus as set forth in any one of claims 1, 2, 3 or 4, wherein
the charcoal charging section further comprises a
section in which calcium carbonate mineral is charged.

8. The water treatment apparatus as set forth in any one of claims 1, 2, 3 and 4, further comprising
an activated carbon adsorption tower into which the treatment water derived from the water treatment water tank is introduced.

9. A water treatment method, comprising the steps of:
introducing treatment water, which is to be subjected to treatment, to a water treatment water tank of the apparatus of any one of claims 1, 2, 3, and 4, wherein
micro-nano bubbles are produced in said treatment water; and microorganisms are propagated on the charcoal;
said method further comprising treating the treatment water by the microorganisms propagated on the charcoal.

10. The water treatment method as set forth in claim 9, further comprising the step of:
generating a water stream of the treatment water within the water treatment water tank.

11. The water treatment method of claim 9, wherein
the treatment water introduced into the water treatment water tank contains organofluoric compounds.

12. The water treatment method of claim 11, wherein
the organofluoric compounds are perfluorooctane sulfonate or perfluorooctanoic acid or a mixture of perfluorooctane sulfonate and perfluorooctanoic acid.

* * * * *